United States Patent
Casagrande et al.

(10) Patent No.: US 10,575,063 B2
(45) Date of Patent: Feb. 25, 2020

(54) MESSAGE TUNNELING OVER CLOSED CAPTIONING

(71) Applicant: DISH Network L.L.C., Englewood, CO (US)

(72) Inventors: Steven Michael Casagrande, Castle Pines, CO (US); Charlie William Zetterower, Parker, CO (US); Kenneth Robert Hodge, Castle Rock, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 15/857,895

(22) Filed: Dec. 29, 2017

(65) Prior Publication Data

US 2019/0141406 A1    May 9, 2019

Related U.S. Application Data

(60) Provisional application No. 62/581,647, filed on Nov. 3, 2017.

(51) Int. Cl.
*H04N 21/488* (2011.01)
*H04N 21/234* (2011.01)
(Continued)

(52) U.S. Cl.
CPC ....... *H04N 21/4884* (2013.01); *H04N 21/235* (2013.01); *H04N 21/23424* (2013.01);
(Continued)

(58) Field of Classification Search
CPC ............... H04N 21/235; H04N 21/236; H04N 21/23608; H04N 21/23614; H04N 21/242;
(Continued)

(56) References Cited

U.S. PATENT DOCUMENTS 9,961,377 B1 * 5/2018 Miner ............... H04N 21/23424
2004/0015999 A1 * 1/2004 Carlucci .................. H04N 5/76
725/136
(Continued)

FOREIGN PATENT DOCUMENTS

EP         2 658 247 A1    10/2013
WO    2016/190720 A1    12/2016

OTHER PUBLICATIONS

International Search Report and Written Opinion for PCT/US2018/058926 dated Dec. 20, 2018, all pages.

*Primary Examiner* — Jeremy S Duffield

(57) ABSTRACT

Original transmitters of television broadcast content, such as national broadcasters, may tunnel various data such as SCTE-35 messages through a special closed captioning service before handoff to their local affiliates. The tunneled SCTE-35 messages may thus survive the re-encoding of both the local broadcaster to an over-the-air (OTA) retransmission, and re-encoding by any subsequent cable or satellite television providers as well. An uplink center and television service provider (e.g., a cable or satellite system) may receive the transport stream from the local broadcaster, may strip out the tunneled SCTE-35 messages from extra closed captioning streams at the uplink, re-create the SCTE-35, and then process it at the uplink of the satellite system, for example, by performing ad insertion, re-muxing the SCTE-35 for the satellite broadcast, and/or modifying it and sending it over the satellite broadcast on a separate PID to the set top boxes for those STBs for ad insertion.

16 Claims, 7 Drawing Sheets

(51) Int. Cl.

| | | |
|---|---|---|
| *H04N 21/434* | (2011.01) | |
| *H04N 21/236* | (2011.01) | |
| *H04N 21/235* | (2011.01) | |
| *H04N 21/435* | (2011.01) | |
| *H04N 21/242* | (2011.01) | |
| *H04N 21/81* | (2011.01) | |
| *H04N 21/44* | (2011.01) | |
| *H04N 21/4402* | (2011.01) | |
| *H04N 21/854* | (2011.01) | |
| *H04N 21/2347* | (2011.01) | |

(52) U.S. Cl.
CPC . *H04N 21/23608* (2013.01); *H04N 21/23614* (2013.01); *H04N 21/242* (2013.01); *H04N 21/435* (2013.01); *H04N 21/4344* (2013.01); *H04N 21/4348* (2013.01); *H04N 21/4402* (2013.01); *H04N 21/44016* (2013.01); *H04N 21/4882* (2013.01); *H04N 21/4888* (2013.01); *H04N 21/812* (2013.01); *H04N 21/854* (2013.01); *H04N 21/23476* (2013.01)

(58) Field of Classification Search
CPC .. H04N 21/43; H04N 21/4302; H04N 21/434; H04N 21/4348; H04N 21/435; H04N 21/812; H04N 21/4882; H04N 21/4884; H04N 21/4888
See application file for complete search history.

(56) References Cited

U.S. PATENT DOCUMENTS

| | | | |
|---|---|---|---|
| 2010/0037253 A1* | 2/2010 | Sheehan | H04N 21/812 725/31 |
| 2011/0302600 A1 | 12/2011 | Kelsen | |
| 2012/0266010 A1* | 10/2012 | Kumar | G06F 1/14 713/503 |
| 2013/0290556 A1 | 10/2013 | Giladi | |
| 2014/0047496 A1* | 2/2014 | Kim | H04N 21/235 725/137 |
| 2016/0182923 A1* | 6/2016 | Higgs | H04N 21/23424 725/34 |
| 2016/0198227 A1* | 7/2016 | Singh | H04N 21/4622 725/32 |
| 2017/0289228 A1 | 10/2017 | Romrell | |

\* cited by examiner

MESSAGE TUNNELING OVER CLOSED CAPTIONING

CROSS-REFERENCES TO RELATED APPLICATIONS

This present application is a non-provisional of and claims priority to U.S. Provisional Patent Application No. 62/581,647, filed Nov. 3, 2017, and entitled "MESSAGE TUNNELING OVER CLOSED CAPTIONING," the entire disclosure of which is hereby incorporated by reference, for all purposes, as if fully set forth herein.

TECHNICAL FIELD

The present disclosure relates to apparatuses and methods of content transmission, transcoding, and modification in multi-level transmission architectures. In particular, the disclosure relates to embedding messages within particular content streams for tunneling through intermediate transmitters within multi-level architectures.

BACKGROUND

During transmission of transport streams, such as digital television broadcasts, certain messages may be included within the transport stream to provide signals or instructions to downstream components. For example, when a television broadcaster broadcasts a Single Program Transport Stream (SPTS) of television content, the SPTS may include various types of Society of Cable Telecommunications Engineers (SCTE) messages, which may be multiplexed within a designated packet identifier in the stream. An example of a SCTE message is an SCTE-35 message that indicates that a commercial or other message (e.g., advertisement, public service announcement, etc.) is upcoming within the transport stream. Such messages may be used by satellite systems, cable systems, over-the-top (OTT) systems, etc., to perform local advertisement insertion and other related functions.

However, within multi-layer transmission architectures, the possibility exists that such messages within the transport stream may be stripped out by intermediate transmitters. For instance, when a national television broadcast passes through local affiliate broadcasters and/or other intermediary transcoders, SCTE-35 transport packets might be stripped out and not preserved within the transport stream as it continues to further downstream components.

Thus, a need exists to preserve SCTE-35 messages and/or various additional types of message data, which are transmitted from a top-level broadcaster to the various uplink centers and re-transmitters that receive the transport single indirectly via one or more intermediate transmitters.

SUMMARY

Various methods, systems, and apparatus are disclosed for tunneling messages within particular content streams through intermediate transmitters within multi-level architectures.

According to certain aspects described herein, a top-level content transmitter, such as national digital television broadcaster, may tunnel certain messages through a particular closed caption service before transmitting the content stream to their local affiliates. In some embodiments, a television broadcaster may use a digital television closed caption (DTVCC) inserter component to detect SCTE-35 messages (and/or additional types of messages detected at the broadcaster), and then generate and embed corresponding messages containing the SCTE-35 presentation timestamp (PTS) data within a selected closed caption service. The tunneled SCTE-35 messages may thus survive any decoding/re-encoding processes performed by intermediate components, such as by the local broadcaster (e.g., to an over-the-air (OTA) retransmission), and by any subsequent cable or satellite television providers as well.

In some embodiments, an uplink center and/or television service provider, such as a cable or satellite system, may receive a transport stream indirectly via a local affiliate broadcaster, and may read/extract tunneled messages from the closed captioning streams at the uplink. For example, a digital television closed caption (DTVCC) extractor component may be used by a downstream system (e.g., uplink and satellite television provider), to detect and extract any SCTE-35 messages from the particular closed caption service. In some cases, SCTE-35 messages may be re-created and then processed by the DTVCC extractor, for example, by forwarding the SCTE-35 messages to an ad insertion component, and/or re-generating and re-multiplexing the SCTE-35 messages back into the television broadcast transport stream. Thus, in the case of the satellite television provider, the SCTE-35 messages may be re-multiplexed back into the transport stream, within a separate packet identifier (PID), and then broadcast to the individual subscriber devices (e.g., set-top boxes) and/or other downstream devices which may insert advertisements and/or other local content.

Thus, the various embodiments described herein may allow for SCTE-35 messages, or any other type of messages, embedded within transport streams transmitted by a national broadcaster (e.g., NBC, CBS, ABC, or FOX), to be received by uplink centers and/or set-top-boxes, even when the broadcast is received through local affiliate channels that may decode, modify, and re-encode the transport stream. As noted above, such messages, which may be carried on a separate packet identifier, may be stripped out by the local broadcasters before they are broadcast over the air (OTA), and so uplink centers, re-transmitters, and set top boxes (STBs) downstream might not otherwise receive such messages within the transport stream at their local receive facilities from each local affiliate.

Certain embodiments described herein may relate particularly to SCTE-35 messages, which are a particular type of message used to perform insertion of advertisements or other content. SCTE-35 messages, for example, may include timestamp data and/or other information that may be used by cable systems, satellite systems, and OTT systems, etc. Such SCTE-35 messages may be multiplexed into digital television broadcast transport streams that are transmitted by a top-level broadcaster (e.g., a national broadcaster) to indicate that a commercial message (e.g., an advertisement) is upcoming. SCTE-35 messages, and/or other messages related to insertion of advertisements, may include an indicator that an advertising break is upcoming, along with specific timing information for the upcoming break (e.g., an absolute or relative timestamp indicating precisely when the upcoming advertisement will occur within the stream). Additionally, SCTE-35 messages, and/or similar other messages relating to the timing of content insertion, may include additional data such as metadata including permissions set by the broadcaster indicating whether or not the ad insertion may be skipped, specifying which entities are or are not permitted to insert content at the upcoming advertising break, and/or what particular content or types of content may or may not be inserted.

Therefore, according to various aspects described herein, upstream transmitters of content (e.g., national television broadcasters or other head-end content transmitters) may tunnel SCTE-35 messages (or any other message type) through a special closed captioning service, before transmitting the transport stream to the intermediate broadcasters (e.g., local television broadcaster affiliates). The tunneled SCTE-35 messages within the closed captioning stream thus may survive any decodings, modifications, and re-encodings performed by local broadcasters, as well as any subsequent re-encoding performed by cable or satellite encoders as well. Uplink centers and/or television service providers (e.g., satellite systems, cable systems, OTT systems, etc.) may receive the transport stream from the local broadcaster via over-the-air (OTA) transmission, and then may detect and extract the tunneled SCTE-35 messages from the closed captioning stream at the uplink. The SCTE-35 messages (and any other messages embedded within the closed captioning stream) may be re-created and/or processed at the uplink of the satellite system, for example, by performing insertion of advertisements, re-multiplexing the SCTE-35 for the satellite broadcast, and/or modifying it and sending it over the satellite broadcast on a separate packet ID to the set-top boxes for those set-top boxes to perform ad insertion.

Additional aspects described herein include further techniques related to tunneling messages using closed captioning services, for television broadcasts and other transmissions of content, within multi-layer transmission architectures. For example, additional aspects relate to analyzing and/or converting time data within SCTE-35 messages. For example, absolute presentation timestamp (PTS) within a SCTE-35 message, identifying the precise time of an upcoming advertising break, may be converted into a relative PTS before embedding the message data and timestamp into the closed captioning service, in order to account for the changing of the PTS that may occur when the transport stream is transcoded and/or modified at local broadcast affiliates and/or other intermediate systems. Additionally, in certain embodiments, SCTE-35 messages and/or other messages that are tunneled within closed captioning services may be encrypted, to prevent identification and/or manipulation of such messages by unauthorized intermediate or downstream systems receiving the content. Further, beyond using the message tunneling techniques described herein for insertion of advertisements, similar and/or identical techniques may be used to embed messages to trigger interactive television features and/or other features related to usage or playback of the television content.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures in conjunction with the description of certain embodiments presented herein. However, the appended figures should not be seen as limiting or defining the present disclosure.

Figure 1:
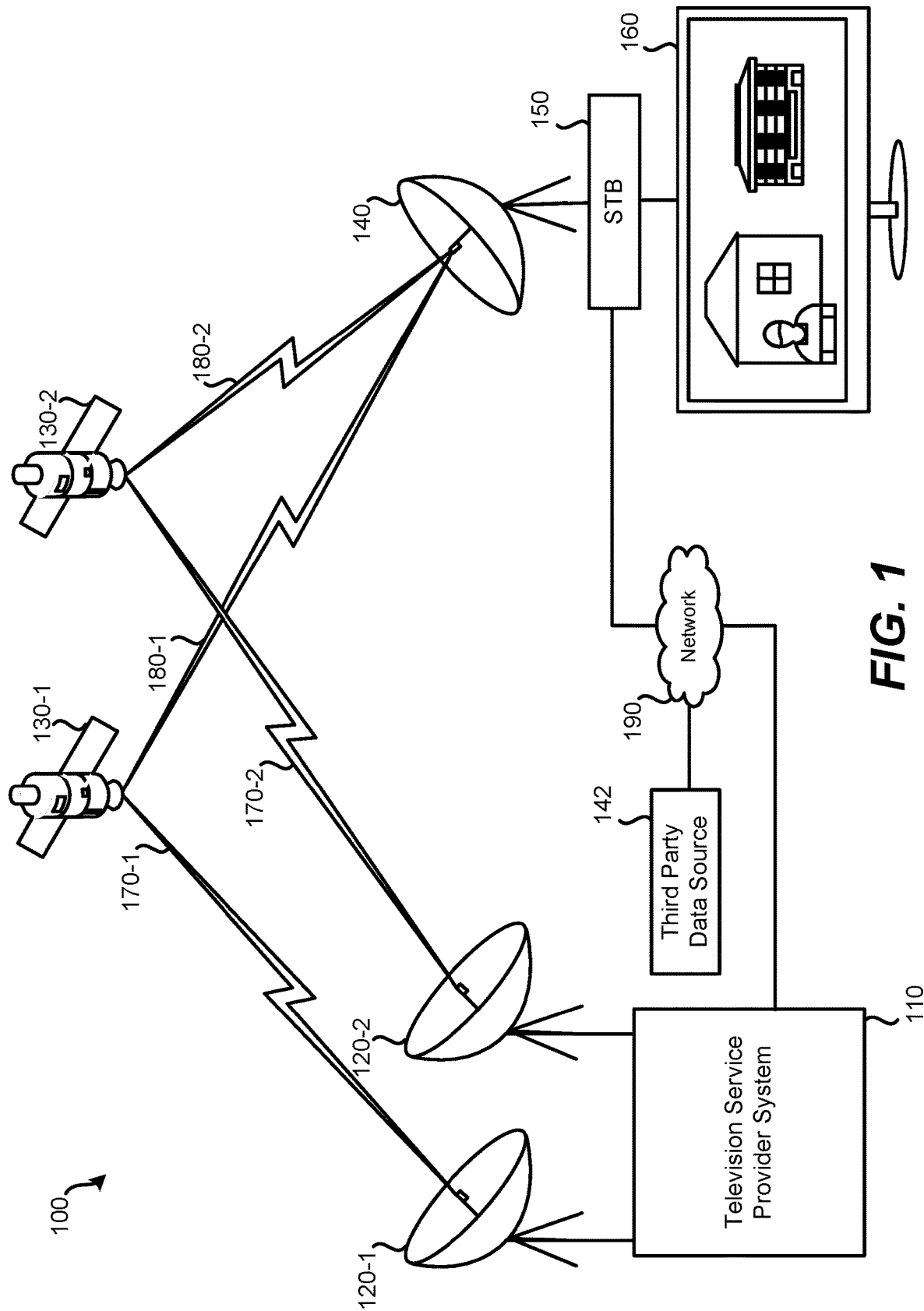
FIG. 1 illustrates a diagram of a satellite television distribution system, in accordance with certain embodiments of the present disclosure.

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Although embodiments detailed herein may be directed toward controlling television-based equipment, the principles easily can be extended to other types of content and devices, such as computer equipment, handheld electronic devices, and the like. In addition, the terms "television" or "television service" can include traditional television programming, such as linear television programs, as well as other types of audio, video and/or audio/video content, such as on-demand video content, streaming video content and the like delivered via any type of content delivery systems, such as a cable, satellite, cellular/wireless, Internet/IP and/or any other content delivery technology or system currently known or hereafter developed. Furthermore, embodiments herein describe set-top boxes and/or other devices being connected with a television or other device having an electronic display. However, features disclosed herein can also be incorporated into the device having the electronic display, such as a television with an integrated cable, satellite or IPTV receiver.

Various techniques (e.g., methods, systems, computer-readable storage media devices coupled to processors and storing computer executable instructions, etc.) are disclosed for providing message tunneling functionality over closed captioning services within transport streams of video content (e.g., digital television broadcast transport streams). As discussed below in more detail, certain embodiments described in the present disclosure provide for top-level content transmitters, such as national digital television broadcasters, to extract and tunnel certain messages through particular closed caption services before transmitting the transport stream downstream (i.e., to local affiliate broadcasters). In some embodiments, a television broadcaster may use a digital television closed caption (DTVCC) inserter component to detect SCTE-35 messages (and/or additional types of messages detected at the broadcaster), and then generate and embed corresponding messages containing the SCTE-35 message data within a selected closed caption service. The tunneled SCTE-35 messages may thus survive any decoding/re-encoding processes performed by intermediate components, such as by the local broadcaster (e.g., to an over-the-air (OTA) retransmission), and by any subsequent cable or satellite television providers as well.

In some embodiments, an uplink center and/or television service provider, such as a cable or satellite system, may receive a transport stream indirectly via a local affiliate broadcaster, and may read/extract tunneled messages from the closed captioning streams at the uplink. For example, a digital television closed caption (DTVCC) extractor component may be used by a downstream system (e.g., uplink and satellite television provider), to detect and extract any SCTE-35 messages from the particular closed caption service. In some cases, SCTE-35 messages may be re-created and then processed by the DTVCC extractor, for example, by forwarding the SCTE-35 messages to an ad insertion component, and/or re-generating and re-multiplexing the SCTE-35 messages back into the television broadcast transport stream. Thus, in the case of the satellite television provider, the SCTE-35 messages may be re-multiplexed back into the transport stream, within a separate packet identifier (PID), and then broadcast to the individual subscriber devices (e.g., set-top boxes) and/or other downstream devices which may insert advertisements and/or other local content.

FIG. 1 illustrates an embodiment of a satellite television distribution system 100, on which various aspects of the present disclosure may be implemented. For example, in various embodiments a digital television broadcast may be transmitted from a top-level transmitter (e.g., a national broadcaster) through one or more intermediate transcoding systems (e.g., local affiliates) to a satellite provider system 110. Messages may be tunneled between the top-level transmitter and the satellite provider system 110 using closed caption services, and thus the satellite provider system 110 may include a digital television closed caption (DTVCC) extractor component, described in more detail below, to detect, extract, and process such messages. In some embodiments, a DTVCC extractor may be implemented within set-top boxes 150 instead of or in addition to DTVCC extractors implemented within the satellite provider system 110.

Satellite television distribution system 100 may include: television service provider system 110, satellite transmitter equipment 120, satellites 130, satellite dish 140, set-top box 150, and television 160. Alternate embodiments of satellite television distribution system 100 may include fewer or greater numbers of components. While only one satellite dish 140, set-top box 150, and television 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of transmitting equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder stream 180. Satellites 130 may be in geosynchronous orbit. Each satellite 130 may be in a different orbital slot, such that the signal path between each satellite, uplink stations, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite uplink 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of set-top box (STB) 150 and/or satellite dish 140, it may only be possible to capture transponder streams from a limited number of transponders concurrently. For example, a tuner of STB 150 may only be able to tune to a single transponder stream from a transponder of a single satellite at a time.

Figure 2:
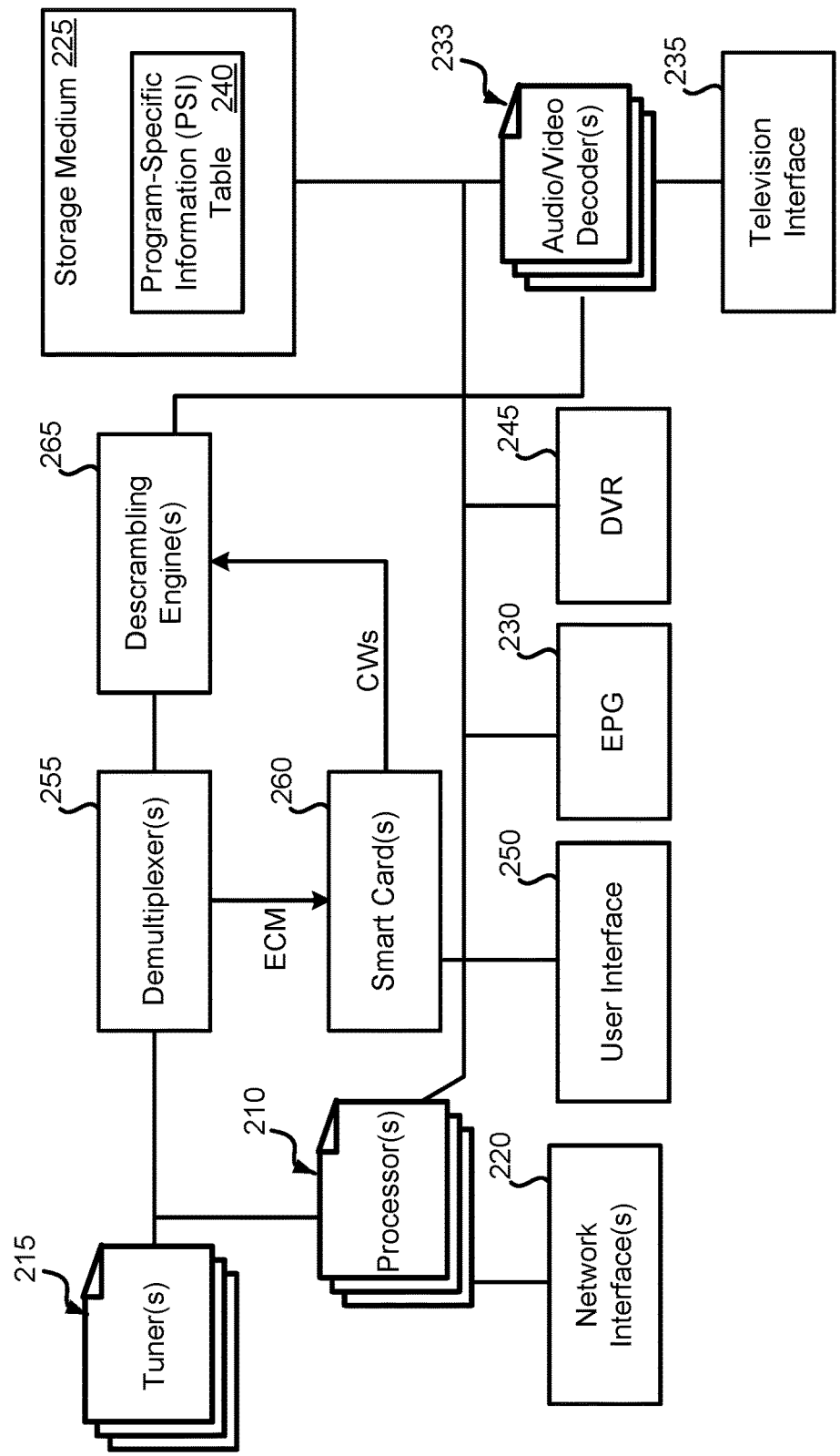
FIG. 2 illustrates a simplified diagram of a set-top box television receiver, in accordance with certain embodiments of the present disclosure.

In communication with satellite dish 140, may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of set-top box 150. As such, set-top box 150 may decode signals received via satellite dish 140 and provide an output to television 160. FIG. 2 provides additional detail of receiving equipment.

Television 160 may be used to present video and/or audio decoded by set-top box 150. Set-top box 150 may also output a display of one or more interfaces to television 160, such as an electronic programming guide (EPG). In some embodiments, a display device other than a television may be used.

Uplink signal 170-1 represents a signal between satellite uplink 120 and satellite 130-1. Uplink signal 170-2 represents a signal between satellite uplink 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal path between satellite 130-1 and satellite dish 140. Transponder stream 180-2 represents a signal path between satellite 130-2 and satellite dish 140. Each of transponder streams 180 may contain one or more different television channels in the form of SPTS, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay 32 transponder streams via corresponding transponders to user equipment. For clarity, it should be noted that satellites carry many transponders, and transponders may carry a single multiplexed transport stream containing many PIDs. A service consists of one or more PIDs for audio, video, and data on that multiplexed transport stream.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. STB 150 may decode the received transponder stream. As such, depending on which television channel(s) are desired, a transponder stream from a different satellite (or a different transponder of the same satellite) may be accessed and decoded by STB 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and set-top box 150. Via such a secondary communication channel, bidirectional exchange of data may occur. As such, data may be transmitted to television service provider system 110 via network 190. Data may also be transmitted from television service provider system 110 to STB 150 via network 190. Network 190 may be the Internet. While audio and video services may be provided to STB 150 via satellites 130, feedback from STB 150 to television service provider system 110 may be transmitted via network 190. In some embodiments, STB 150 may be communicatively coupled via the network 190 with one or more third party data sources 142. The one or more third party data sources 142 may provide third party reference data, which will be discussed further herein.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

FIG. 2 illustrates a block diagram of an embodiment of a set-top box 200. STB 200 may be set-top box 150 of FIG. 1, or may be incorporated as part of a television, such as television 160 of FIG. 1. STB 200 may include: processors 210, tuners 215, network interfaces 220, non-transitory computer-readable storage medium 225, electronic programming guide (EPG) 230, television interface 235, program-specific information (PSI) table 240, digital video recorder (DVR) 245, user interface 250, demultiplexer 255, smart card 260, and/or descrambling engine 265. In other embodiments of STB 200, smaller or greater numbers of components may be present. Various embodiments of STB 200 may include any suitable number of tuners 215 and attendant components, such as decoders 233, to facilitate various features disclosed herein. For example, various embodiments may include up to eight or more—any suitable number—of tuners 215 to facilitate embodiments of the present disclosure. It should be understood that the various components of STB 200 may be implemented using hardware, firmware, software, and/or some combination thereof. For example, EPG 230 may include software instructions to be executed by processors 210.

Processors 210 may include one or more general-purpose processors configured to perform processes such as commanding a tuner, demodulator, demultiplexer, descrambling engine, and audio video decoders to tune to a particular channel, displaying the EPG, and/or receiving and processing input from a user. Processors 210 may include one or more special purpose processors. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by processor 210 in some embodiments. In some embodiments, functions performed by various modules such as descrambling engine 265 may be performed using one or more dedicated processors.

Tuners 215 may include one or more tuners used to facilitate tuning to television channels, such as television channels transmitted via satellite or cable. Each tuner contained in tuners 215 may be capable of receiving and processing one or more streams of data from a satellite transponder (or a cable RF channel) at a given time. As such, a single tuner may tune to one transponder (or cable RF channel). If tuners 215 include multiple tuners, one tuner may be used to tune to a television channel on a first transponder for display using a television, while one or more tuners of the set-top box may be identified that are idle. For example, if the set-top box has four tuners, the three tuners not being used to tune to the first television channel may be idle. An idle tuner may be defined as a tuner that is not being used to receive a transponder stream for presentation of a television channel via a presentation device or for recording of a television channel. An idle tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording in some embodiments. Additionally or alternatively, the availability of audio/video decoding resources may be determined. For example, the number of audio/video decoder submodules 233 that are idle may be determined. An audio/video decoder submodule may be defined as idle when the audio/video decoder submodule is not being used to decode video and/or audio received from a DVR or descrambling engine.

Network interface(s) 220 may be used to communicate via an alternate communication channel with a television service provider. For example, the primary communication channel may be via satellite (which may be unidirectional to the STB) and the alternate communication channel (which may be bidirectional) may be via a network, such as the Internet. Network interface(s) 220 may include a modem interface, as a STB may include a modem in some embodiments, as well other interfaces described herein. Referring back to FIG. 1, STB 150 may be able to communicate with television service provider system 110 via a network, such as the Internet. This communication may be bidirectional: data may be transmitted from STB 150 to television service provider system 110 and from television service provider system 110 to STB 150. Referring back to FIG. 2, network interface 220 may be configured to communicate via one or more networks, such as the Internet, to communicate with television service provider system 110 of FIG. 1 and other information sources. Information may be transmitted and/or received via network interface(s) 220.

Storage medium 225 may represent a non-transitory computer readable storage medium. Storage medium 225 may include memory and/or a hard drive. Storage medium 225 may be used to store information received from one or more satellites and/or information received via network interface 220. Storage medium 225 may store information related to EPG 230, PSI table 240, and/or DVR 245. DVR 245 may include software instructions, stored on the storage medium 225, to be executed by the processor(s) in order to provide DVR functions. Additionally, recorded television programs may be stored using storage medium 225.

EPG 230 may include software instructions to be executed by the processor(s) in order to provide EPG functions and rendering of data. EPG 230 may store information related to television channels and the timing of programs appearing on such television channels. In some embodiments, EPG 230, including software instructions and EPG data, may be stored using non-transitory storage medium 225, which may be a hard drive. EPG 230 may be used to inform users of what television channels or programs are popular and/or provide recommendations to the user. EPG 230 may provide the user with a visual interface displayed by a television that allows a user to browse and select television channels and/or television programs for viewing and/or recording via DVR 245. Information used to populate EPG 230 may be received via network interface 220 and/or via satellites, such as satellites 130 of FIG. 1 via tuners 215. For instance, updates to EPG 230 may be received periodically via satellite. EPG 230 may serve as an interface for a user to control DVR 245 to enable viewing and/or recording of multiple television channels simultaneously.

One or more audio/video decoders 233 may serve to convert encoded video and audio into a format suitable for output to a display device. For instance, audio/video decoder 233 may receive MPEG video and audio from storage medium 225 or descrambling engine 265 to be output to a television. Audio/video decoder 233 may convert the MPEG video and audio into a format appropriate to be displayed by a television or other form of display device and audio into a format appropriate to be output from speakers, respectively. The number of audio/video decoders 233 may or may not correspond to the number of tuners 215 in certain embodiments.

Television interface 235 may serve to output a signal to a television (or another form of display device) in a proper format for display of video and playback of audio. As such, television interface 235 may output one or more television channels, stored television programming from storage medium 225 (e.g., DVR 245 and/or information from EPG 230) to a television for presentation.

The program-specific information (PSI) table 240 may store information used by set-top box 200 to access various television channels. PSI table 240 may be stored using storage medium 225. Information used to populate PSI table 240 may be received via satellite (or cable) through tuners 215 and/or may be received via network interface 220 from the television service provider. As such, information present in PSI table 240 may be periodically updated. PSI table 240 may be locally-stored by STB 200 using storage medium 225. Information that may be present in PSI table 240 may include: television channel numbers, a satellite identifier, a frequency identifier, a transponder identifier, an ECM PID, one or more audio PIDs, and a video PID. (A second audio PID of a channel may correspond to a second audio program (SAP), such as in another language.) In some embodiments, PSI table 240 may be divided into additional tables. For example, rather than the specific audio PIDs and video PIDs being present in PSI table 240, a channel identifier may be present within PSI table 240 which may be used to lookup the audio PIDs and video PIDs in another table.

Table 1 provides a simplified example of PSI table 240 for several television channels. It should be understood that in other embodiments, many more television channels may be represented in PSI table 240. PSI table 240 is periodically updated by a television service provider. As such, television channels may be reassigned to different satellites and/or transponders, and STB 200 may be able to handle this reassignment as long as PSI table 240 is updated.

TABLE 1

| Channel | Satellite | Transponder | ECM PID | Audio PIDs | Video PID |
|---|---|---|---|---|---|
| 4 | 1 | 2 | 27 | 1001 | 1011 |
| 5 | 2 | 11 | 29 | 1002 | 1012 |
| 7 | 2 | 3 | 31 | 1003 | 1013 |
| 13 | 2 | 4 | 33 | 1003, 1004 | 1013 |

It should be understood that the values provided in Table 1 are for example purposes only. Actual values, including how satellites and transponders are identified, may vary. Additional information may also be stored in PSI table 240. Video and/or audio for different television channels on different transponders may have the same PIDs. Such television channels may be differentiated based on which satellite and/or transponder to which a tuner is tuned.

Digital Video Recorder (DVR) 245 may include software instructions and/or data stored on storage medium 225. DVR 245 permit a television channel to be recorded for a period of time. DVR 245 may store timers that are used by processors 210 to determine when a television channel should be tuned to and recorded to DVR 245 of storage medium 225. In some embodiments, a limited amount of storage medium 225 may be devoted to DVR 245. Timers may be set by the television service provider and/or one or more users of the STB. DVR 245 may be configured by a user to record particular television programs. Whether a user directly tunes to a television channel or DVR 245 tunes to a first television channel, PSI table 240 may be used to determine the satellite, transponder, ECM PID (packet identifier), audio PID, and video PID.

User interface 250 may include a remote control (physically separate from STB 200) and/or one or more buttons on STB 200 that allows a user to interact with STB 200. User interface 250 may be used to select a television channel for viewing, view EPG 230, and/or program DVR 245.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which in combination with PSI table 240, can be determined to be associated with particular television channel. Particular data packets, referred to as entitlement control messages (ECMs), may be periodically transmitted. ECMs may be encrypted; STB 200 may use smart card 260 to decrypt ECMs. Decryption of an ECM may only be possible if the user has authorization to access the particular television channel associated with the ECM. When an ECM is received by demultiplexer 255 and the ECM is determined to correspond to a television channel being stored and/or displayed, the ECM may be provided to smart card 260 for decryption.

When smart card 260 receives an encrypted ECM from demultiplexer 255, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260.

When an ECM is received by smart card 260, it may take a period of time for the ECM to be decrypted to obtain the control words. As such, a period of time, such as 2 seconds, may elapse before the control words indicated by the ECM can be obtained. Smart card 260 may be permanently part of STB 200 or maybe configured to be inserted and removed from STB 200.

Demultiplexer 255 may be configured to filter data packets based on PIDs. For example, if a transponder data stream includes multiple television channels, data packets corresponding to a television channel that is not desired to be stored or displayed by the user, may be ignored by demultiplexer 255. As such, only data packets corresponding to the one or more television channels desired to be stored and/or displayed may be passed to either descrambling engine 265 or smart card 260; other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to PSI table 240, may be appropriately routed by demultiplexer 255. It should be understood that, in some embodiments, all peripherals may communicate with main memory (RAM)/DRAM when communicating with other components.

Descrambling engine 265 may use the control words output by smart card 260 in order to descramble video and/or audio corresponding to television channels for storage and/or presentation. Video and/or audio data contained in the transponder data stream received by tuners 215 may be scrambled. The video and/or audio may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (via DVR 245) and/or to audio/video decoder 233 for output to a television or other presentation equipment via television interface 235 or both.

For simplicity, STB 200 of FIG. 2 has been reduced to a block diagram, commonly known parts, such as a power supply, have been omitted. Further, some routing between the various modules of STB 200 has been illustrated. Such illustrations are for exemplary purposes only. Two modules not being directly or indirectly connected does not indicate the modules cannot communicate. Rather, connections between modules of the STB 200 are intended only to indicate possible common data routing. It should be understood that the modules of STB 200 may be combined into a smaller number of modules or divided into a greater number of modules. Further, the components of STB 200 may be part of another device, such as built into a television. Also, while STB 200 may be used to receive, store, and present television channels received via a satellite, it should be understood that similar components may be used to receive, store, and present television channels via a cable network. Additionally, although not shown in this example, in some cases an STB may include a DTVCC extractor component to detect, extract, and process messages (e.g., SCTE-35 messages) embedded within a closed captioning service of the digital television transport stream received from the satellite provider system 110.

Figure 3A:
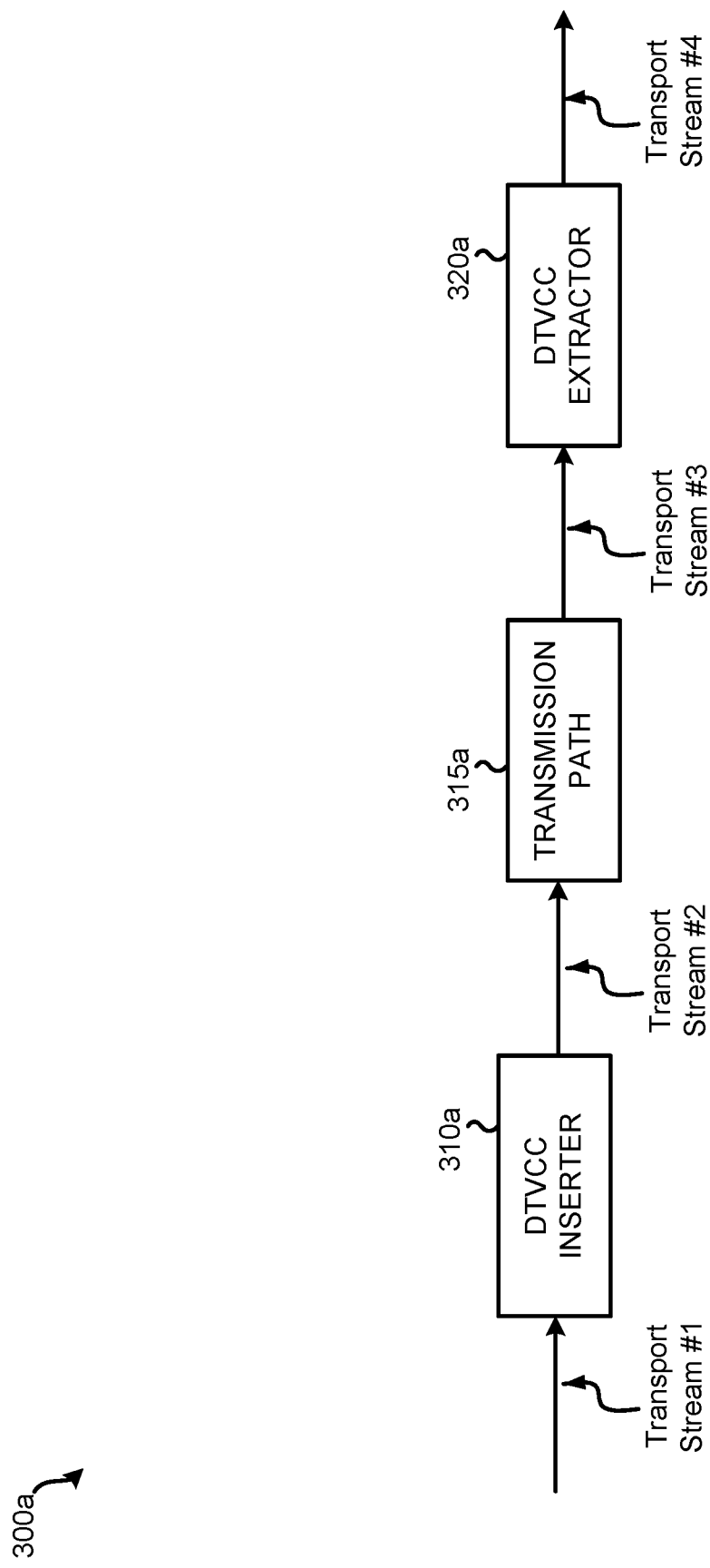
FIG. 3A is a simplified diagram illustrating a digital television closed captioning tunneling system, in accordance with certain embodiments of the present disclosure.

Referring now to FIG. 3A, a diagram is shown of a simplified digital television closed captioning tunneling system 300a. As shown this example, at a high-level, the components of a tunneling system 300a may include a digital television closed captioning (DTVCC) inserter 310a configured to process video transport streams (e.g., single program transport streams (SPTS's)), extract SCTE-35 messages from the appropriate packet identifier (PID) of the transform streams, and generate corresponding messages to be embedded within the closed captioning services of the transport stream. In some embodiments, the DTVCC inserter 310a may be configured to parse MPEG transport packets from a specified PID in order to extract MPEG sections. The DVTCC inserter 310a then may insert the MPEG sections into a specified closed captioning service of the transport stream. As discussed above, in some embodiments, the DTVCC inserter component 310a may be implemented within a top-level transmitter, such as national television broadcaster. Although the DTVCC inserter 310a may be configured to detect any types of messages, in some embodiments the inserter 310a may be specifically configured to detect SCTE-35 messages, and then to add corresponding data to a designated closed captioning service (or CC stream, channel, etc.) of the television broadcast transport stream.

As shown in this example, the tunneling system 300a also may include a corresponding digital television closed caption extractor 320a implemented within a downstream component. The DTVCC extractor 320a may be configured to detect and extract messages from the particular closed captioning service, that were inserted upstream by the DVTCC inserter 310a. In some embodiments, the DTVCC extractor 320a may be configured to extract MPEG sections from the particular closed captioning service, and then to generate new messages (e.g., SCTE-35 messages) based on the extracted data. For example, the DTVCC extractor 320a may convert the MPEG sections extracted from the closed captioning service into MPEG transport packets on a specified packet identifier, and then multiplex them back into the output transport stream. In other embodiments, the DTVCC extractor 320a might not generate and/or multiplex new SCTE-35 messages back into the transport stream, but instead might only extract and output the SCTE-35 data, for example, to an advertising insertion engine. The DTVCC extractor 320a may operate at an uplink center of satellite television provider (e.g., satellite television provider system 110) that receives a television broadcast via an intermediate local broadcast affiliate. Thus, any SCTE-35 messages that were stripped out of the single program transport stream by the local broadcast affiliate (e.g., during transcoding and modification of the stream by the local affiliate), or any other intermediate system, the uplink center still detect, extract, and/or re-create those SCTE-35 messages from the designated closed captioning service.

Thus, in the simplified system shown in FIG. 3A, in operation, the DTVCC inserter 310a (e.g., implemented within a national television broadcaster facility) may receive the single program transport stream with SCTE-35 messages within the appropriate PID of the transport stream. The DTVCC inserter 310a may detect the SCTE-35 messages within the appropriate PID, and then generate and embed corresponding messages using a predetermined message format, within a particular closed captioning service of the transport stream. The DTVCC inserter 310a also may leave the original SCTE-35 messages in the transport stream, within the appropriate PID designated to carry SCTE-35 messages. The transmission path 315a shown in this example may include one or more intermediate systems configured to transcode and/or modify the transport stream, for example, local television broadcast affiliates. Intermediate systems within the transmission path 315a may or may not strip out the SCTE-35 messages from the transport stream, along with performing other possible modifications to the transport stream received from the top-level broadcaster. The DTVCC extractor 320a, operating at an uplink of a satellite television provider 110, may receive the television broadcast from the national broadcaster via one or more local affiliates and/or other intermediate re-encoder systems. The DTVCC extractor 320a may extract the SCTE-35 message content from the predetermined closed captioning service. After extracting the SCTE-35 message data from the closed captioning, the DTVCC extractor 320a may perform one or more of: regenerating and re-inserting SCTE-35 messages into the transport stream of the transport stream, stripping out or leaving in the SCTE-35 message data from the closed captioning stream, and/or directly or indirectly performing ad insertion on the transport stream based on the SCTE-35 message data extracted from the closed captioning service.

In some embodiments, the content transmitted from the top-level transmitter may correspond to television broadcast transmitted using digital video broadcast transmission standards, to the local affiliate broadcaster, and then from local affiliate broadcaster to an uplink and re-transmitter system, such as a satellite or cable provider system, and then finally to individual receiver devices (e.g., STBs 150). In such cases, the digital television broadcast content may include a transponder data stream, data contained within data packets of a transponder data stream, audio and/or video data contained within data packets, video tracks, audio tracks, metadata tracks, closed captioning information, and/or the like. The data streams of content themselves may correspond to movies, television programs, online digital video, portions thereof, etc. In various embodiments, theses content sources may be received with tuners and/or network interfaces. For example, the content sources may include one or more of video data, audio data, metadata, closed captioning information, EPG data, third party reference data, and/or any other suitable content source.

As noted above, a single program transport stream (SPTS) may be transcoded multiple times as it passes through the transmission path 315a. In such cases, additional processing steps may be needed to get the SCTE-35 timing correct as it leaves the DTVCC extractor 320a. In some embodiments, to accommodate those additional processing steps, the DTVCC inserter 310a may be configured to convert the absolute presentation timestamp (PTS) within the original message, and to generate a corresponding relative presentation timestamp (PTS) using the closest video frame PTS. The DTVCC inserter 310a may insert the relative PTS into the closed caption service, rather than the absolute PTS. The DTVCC extractor 320a may be configured to extract the relative PTS, and then convert the relative PTS value back to an absolute PTS for the purposes of (a) re-multiplexing a SCTE-35 message back into the transport stream, (b) outputting the SCTE-35 to a different source, and/or (c) directly performing ad insertion on the transport stream.

Thus, in some embodiments, the input to a DTVCC inserter 310a (Transport Stream #1) may include a single program transport stream (SPTS) with SCTE-35 messages, while the output of the DTVCC inserter 310a (Transport Stream #2) may include SPTS with the SCTE-35 section data carried in a DTVCC service. If the input SPTS of Transport Stream #1 does not contain SCTE-35, or is not configured to insert SCTE-35, then the DTVCC inserter 310a may pass the transport stream through unchanged.

In various different embodiments, DTVCC inserters 310a may be designed and implemented to include various different features and functionality. For example, as noted above, the DTVCC inserter 310a may be configured to insert MPEG sections extracted from MPEG transport packets on a configurable packet ID, into a configurable DTVCC service. Additionally, in some embodiments, the DTVCC inserter 310a may support data compression. That is, the DTVCC inserter 310a may provide a configurable option that turns data compression on or off, either globally or for particular DTVCC services and/or particular transport streams. In such embodiments, the DTVCC inserter 310a also may support signaling within the transport stream to indicate that the data is compressed.

Similarly, the DTVCC inserter 310a may support data scrambling in some embodiments, for example, via a configurable option that turns data scrambling on or off, either globally for particular DTVCC services and/or for particular transport streams. In such embodiments, the DTVCC inserter 310a also may support signaling within the transport stream to indicate that the data is scrambled.

Additionally, in some embodiments, because certain message data (e.g., SCTE-35 messages) may be time sensitive, the DTVCC inserter 310a may be implemented to operate in real-time or near real-time with respect to detecting the messages (e.g., SCTE-35 messages), extracting the data, and then embedding the message data into the closed captioning service.

In some cases, the DTVCC inserter 310a may be configured so as not to prevent the MPEG sections from containing data other than SCTE-35 section data. Additionally, as noted above, the DTVCC inserter 310a may be configured to insert the data into the appropriate DTVCC service, while not removing the corresponding MPEG transport packets from the transport stream.

In embodiments specific to tunneling SCTE-35 messages, the DTVCC inserter 310a may have a configurable option to convert absolute presentation timestamp (PTS) values within SCTE-35 messages into relative PTS values when inserting the data into the appropriate DTVCC service. For example, when this configuration option is set, the DTVCC inserter 310a may be configured to extract the absolute PTS value from the SCTE-35 message, and then use the closest video frame PTS to convert the absolute PTS value into a relative PTS value. Additionally, in some embodiments, the use of this option will not cause the DTVCC inserter 310a to modify the SCTE-35 transport packets in the output transport stream.

Additionally, in various embodiments, a DTVCC inserter device 310a may be configured to support multiple single program transport streams (SPTSs), and/or may be configured to support multiple DVTCC services per SPTS. In some embodiments, a DTVCC inserter 310a may be configured to support only one packet ID per DVTCC service.

Some implementations of the DTVCC inserter 310a may include a web-based interface through which the inserter 310a may be configured. The DTVCC inserter 310a may store configuration data persistently, so that the configuration data need not be reentered if either of the inserter 310a or the extractor 320a is rebooted. Additionally, the DTVCC inserter 310a may be configured to recover to its previous state following a reboot of the device 310a (e.g., without any user intervention). Similarly, the DTVCC inserter 310a may be configured to recover automatically (e.g., without any user intervention) after a temporary IP network outage.

In some embodiments, the DTVCC inserter 310a may be configured to export its configuration data to an external data file, so that others instances of inserter 310a may access the configuration data file to automatically configure their own settings. Thus, certain DTVCC inserters 310a also may be configured to import configuration data from configuration data files. Moreover, in some embodiments, a DTVCC inserter 310a may be configured to export a separate type of configuration file that is compatible with a DTVCC exporter 320a. Such configuration files generated by inserters 310a may include the reverse/corresponding operations to the insertion operations performed by the inserter 310a, to allow the exporter 320a to detect and extract the SCTE-35 message data (or other message) from the particular closed captioning service used by the inserter 310a to tunnel to the message data.

Finally, in various embodiments, a DTVCC inserter 310a may support IPv4 and/or IPv6 for inputs and/or outputs, and also may be configured to support multicast and unicast on inputs and/or outputs, and also may be configured to support source-specific multicasts (i.e., specific source(s)).

in various different embodiments, DTVCC extractors 320a may be designed and implemented to include various different features and functionality. As noted above, the input to a DTVCC extractor 320a (Transport Stream #3) may be a single program transport stream (SPTS) including one or more DTVCC services. The output of the DTVCC extractor 320a (Transport Stream #4) may be an SPTS with the re-generated SCTE-35 transport packets. A DTVCC extractor 320a also might separately output the SCTE-35 transport packets, for example, to an ad insertion component, instead of or in addition to outputting the SPTS.

In some embodiments, the DTVCC extractor 320a may be configured to extract MPEG sections from a particular configurable DTVCC service, encapsulate the MPEG sections into MPEG transport packets on a configurable packet ID, and then multiplex the MPEG sections into the output SPTS stream. The DTVCC extractor 320a also may be configurable, per SPTS, to output the multiplexed SPTS, or may be configured to output only the MPEG transport packets generated based on the message data extracted from the DTVCC services(s).

As noted above, certain DTVCC inserters 310a may be configured to embed relative PTS values, rather than absolute PTS values, within the DTVCC service(s). Accordingly, DTVCC extractors 320a may be configured to receive and convert the relative PTS values within the DTVCC services, using the closest video frame PTS, into absolute PTS values. Thus, when the tunneled messages are SCTE-35 messages, for example, then the SCTE-35 message re-generated by the extractor 320a may include the updated absolute PTS of the upcoming advertising break in the television broadcast. Furthermore, the DTVCC extractor 320a may be configurable, per DTVCC service and/or per SPTS, to adjust an absolute or relative PTS by an offset PTS value, which may be a positive or negative offset value.

For embodiments when the DTVCC inserter 310a supports data compression and/or data scrambling, then the DTVCC extractor 320a may support corresponding functionalities for data decompression and/or descrambling. When such features are supported, the DTVCC extractor 320a may have configurable options to turn the decompression and descrambling features on or off, per DTVCC service (i.e., for particular closed caption services and not others), and/or per SPTS (i.e., for certain transport streams and not others). Certain DTVCC extractors 320a also may include support for signaling within the stream to indicate whether or not that the data is compressed and/or scrambled.

In some embodiments, because certain message data (e.g., SCTE-35 messages) may be time sensitive, the DTVCC extractor 320a may be implemented to operate in real-time or near real-time with respect to extracting messages (e.g., SCTE-35 messages) from DTVCC services, and then multiplexing and/or outputting MPEG transport packet as soon as the data is extracted from the DTVCC service. In some cases, the DTVCC extractor 320a may be configured so as not to prevent data containing other than SCTE-35 data from being extracted. Additionally, the DTVCC extractor 320a may have configurable options to insert/replace a packet ID value and/or a stream type into the PMT for extracted MPEG transport packets, which may be done per DTVCC and/or per SPTS.

In some embodiments, the DTVCC extractor 320a may be configured to support multiple single program transport streams (SPTSs) and/or multiple digital television closed captioning services (DTVCCs) per SPTS. The extractor 320a also may be configured to support one packet ID per DVTCC service. In some cases, like the inserter 310a, the DTVCC extractor 320a may include a web-based interface through which the extractor 320a may be configured. Additionally, the DTVCC extractor 320a may store configuration data persistently, so that the configuration data need not be reentered if either the inserter 310a or the extractor 320a is rebooted. Additionally, the DTVCC extractor 320a may be configured to recover to its previous state following a reboot of the extractor device 320a (e.g., without any user intervention). Similarly, the DTVCC extractor 320a may be configured to recover automatically (e.g., without any user intervention) after a temporary IP network outage.

Like the DTVCC inserter 310a, the DTVCC extractor 320a may be configured to export its configuration data to an external data file, so that others instances of extractor 320a may access the configuration data file to automatically configure their own settings. Thus, the DTVCC extractor 320a also may be configured to import configuration data from configuration data files. Additionally, the DTVCC extractor 320a may be configured to export a separate type of configuration file compatible with DTVCC inserters 310a. Such configuration files generated by extractors 320a may include the reverse/corresponding operations to the extraction operations performed by the extractor 320a, to allow an inserter 310a to embed the appropriate SCTE-35 message data (or other message data) appropriately on the selected particular closed captioning services to be received and extracted by the extractor 320a.

Finally, in various embodiments, a DTVCC extractor 320a may support IPv4 and/or IPv6 for inputs and/or outputs, and also may be configured to support multicast and unicast on inputs and/or outputs, and also may be configured to support source-specific multicasts (i.e., multiple sources).

Figure 3B:
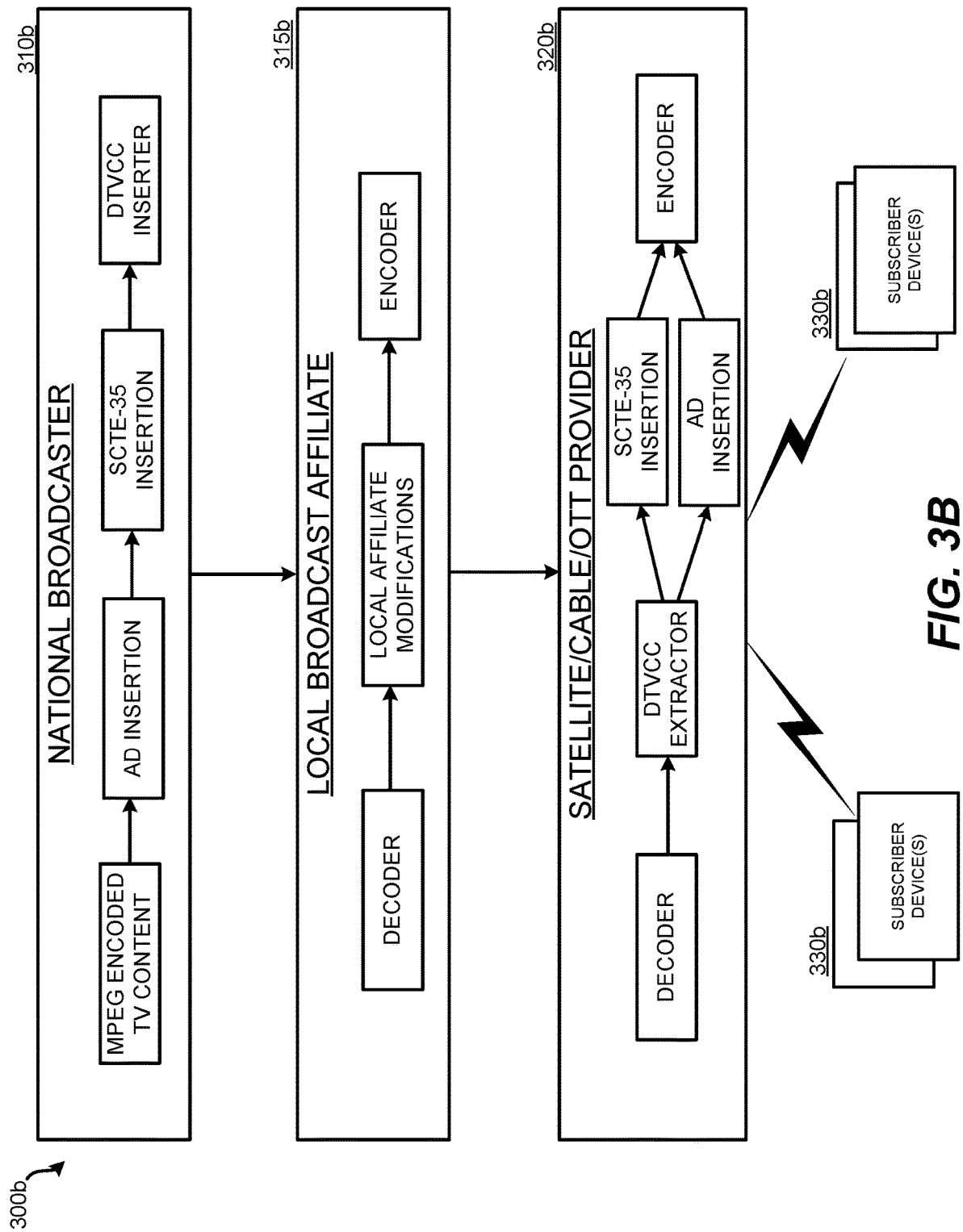
FIG. 3B is another diagram illustrating a digital television closed captioning tunneling system, in accordance with certain embodiments of the present disclosure.

Referring now to FIG. 3B, another diagram is shown of an example digital television closed captioning (DTVCC) tunneling system 300b in accordance with certain embodiments of the present disclosure. Message tunneling system 300b may correspond to the same or similar tunneling system to system 300a shown in FIG. 3A. However, while system 300a is more general in nature, system 300b applies more specifically to embodiments in which SCTE-35 messages are tunneled between a national digital television broadcaster 310b, through a local affiliate broadcaster 315b, to a downstream broadcaster 320b such as a satellite provider, cable provider, or over-the-top content provider, which serves a number of subscriber devices 330b.

As shown in this example, the top-level content transmitter (e.g., the national broadcaster) 310b may receive and/or generate MPEG encoded television content for broadcast. The national broadcaster 310b also may include an advertising insertion component and a corresponding SCTE-35 insertion component to generate and embed SCTE-35 messages within the appropriate packet ID, so that downstream components may have advanced warning of upcoming commercial breaks, systems breaks, etc. These components within the national broadcaster 310a may include various encoders and related components configured to encode the MPEG content with advertisements, and inject SCTE-35 messages to indicate times for playing local advertisements within the transport stream (e.g., using a 4 second pre-roll). Additionally, the national broadcaster 310a may include one or more DTVCC inserters, which may correspond to any embodiment of the DTVCC inserter 310a discussed above, to inject CEA-708 data (i.e., Consumer Electronic Association, standard 708) carrying national ad timing. As discussed above, the DTVCC inserter 310a within the national broadcaster 310b may be configured to insert SCTE-35 within a particular DTVCC service, thereby tunneling the message data to preserve it from intermediate transcoding and stream modifications.

From the national broadcaster 310b, the MPEG content including advertisements, local SCTE-35 messages, and CEA-708 service data is transmitted to an intermediate broadcaster, such as a local affiliate 315b of the national broadcaster 310b. The local affiliate 315b, which may correspond to the transmission path component 315a, may decode, modify, and re-encode the transport stream for a number of reasons. For example, local affiliates 315b may reorder broadcast content, insert local programming (e.g., local news, weather, sports), insert local advertisements, etc. As noted above, during the process of transcoding and modifying the transport streams, local affiliates and other intermediate broadcasters often may strip out SCTE-35 messages from the SPTS transport streams, either deliberately or as a byproduct of the re-encoding process.

The local affiliate 315b, which in some examples may be series of multiple intermediate broadcasters, then may broadcast the modified broadcast stream to one or more satellite television providers 320b, cable television providers 320b, OTT systems 320b, etc. In some examples, the television provider 320b may correspond to a satellite television provider system 110, described above. In this case, the television provider 320b is shown receiving the modified broadcast stream from the local affiliate (without SCTE-35 messages). The television provider 320b may receive and decode the modified broadcast stream, and then forward the MPEG content to a DTVCC extractor (e.g., DTVCC extractor 320a) configured to detect, extract, and process SCTE-35 message data embedded within digital television closed captioning service(s). As discussed below in more detail, based on the SCTE-35 message data detected within the DTVCC service(s), the downstream television provider 320b may regenerate and multiplex new SCTE-35 messages into the transport stream, and/or may provide the SCTE-35 message data to a content insertion component (e.g., an ad insertion component) to select and/or insert advertisements or other content to be inserted into the broadcast stream, based on the timing data and metadata within the extracted SCTE-35 message. Following the insertion of advertising and/or other content, the downstream television provider 320*b* may re-encode and transmit out the transport stream to various receiver client devices (e.g., STBs) 330*b* via its transmission infrastructure.

It should be understood that the functions performed by various systems, components, and modules of the message tunneling systems 300*a* and 300*b* may be performed using one or more processors and memory devices, in conjunction with specific network transmission hardware, satellite or cable transmission systems, etc. Further, it should be understood that the modules of the systems 300*a* and 300*b* may be combined into a smaller number of modules or divided into a greater number of modules.

Figure 4:
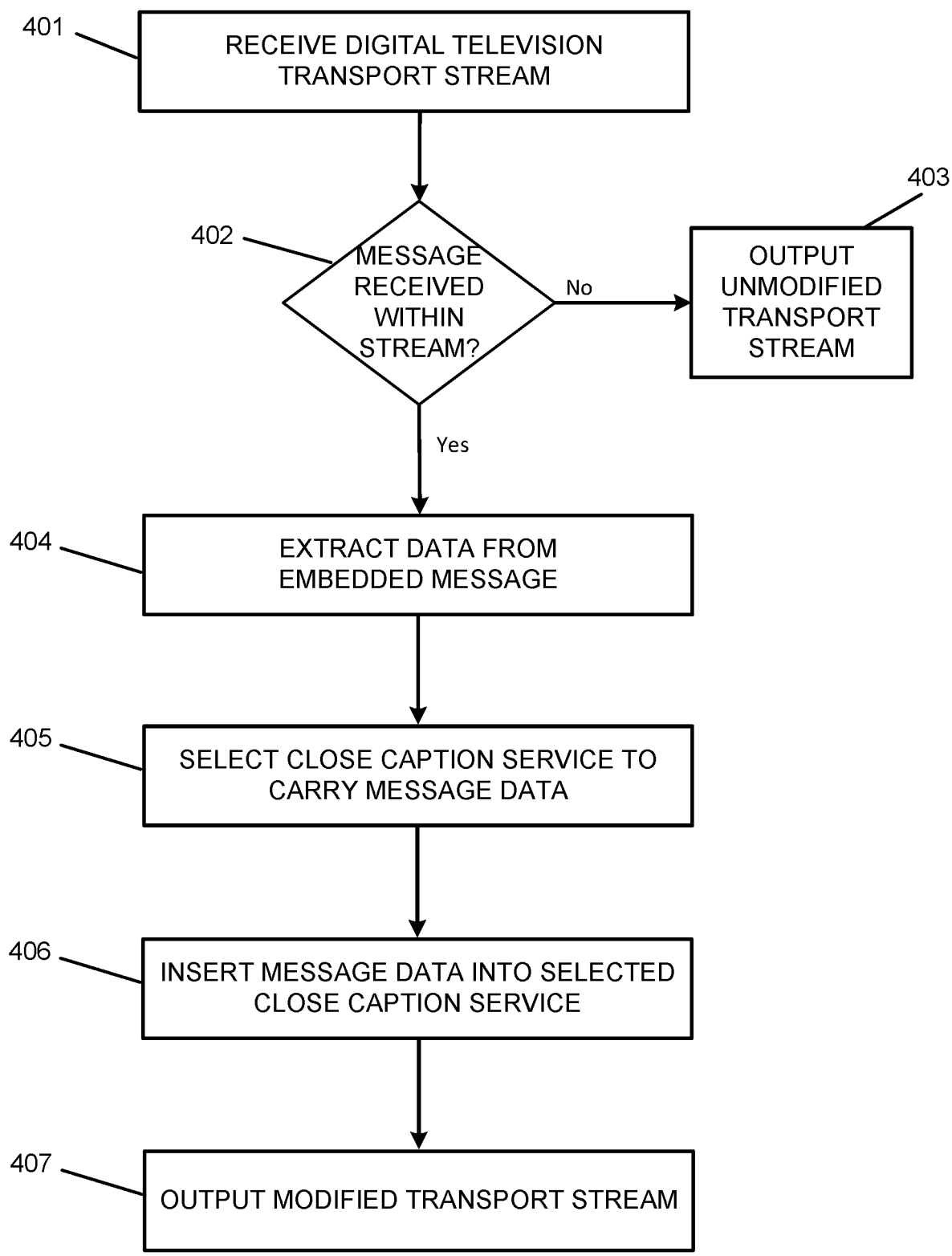
FIG. 4 is a flow diagram illustrating an example process of tunneling messages by an upstream television broadcaster, in accordance with certain embodiments of the present disclosure.

Referring now to FIG. 4, a flow diagram is shown illustrating an example process of tunneling messages within closed captioning services, to be performed by an upstream digital television broadcaster prior to broadcasting the video content to downstream components. In some embodiments, the steps 401-407 in this example may be performed by a DTVCC inserter 310*a*, which may be implemented within or associated with top-level video broadcaster. As discussed above, in some cases steps 401-407 may correspond to the tunneling of SCTE-35 messages from a national broadcaster 310*b* though a local affiliate 315*b* and/or other intermediate transcoders, to a downstream television provider 320*b*. In such embodiments, steps 401-407 correspond to steps which may be performed by the DTVCC inserter 310*a* operating at or in conjunction with the national broadcaster 310*b*.

In step 401, the DTVCC inserter (e.g., inserter device or component 310*a* operating at broadcaster 310*b*) may generate and/or receive a single program transport stream (SPTS) corresponding to a digital television broadcast. As discussed above, the SPTS may include advertising content (or placeholders into which content may be inserted) at particular times within the stream, along with corresponding messages (e.g., SCTE-35 messages) embedded into an appropriate packet ID which provide advanced notice of the upcoming advertising content. In step 402, the DTVCC inserter 310*a* may analyze the transport stream to detect the occurrence of any such messages. Although this example relates to tunneling of SCTE-35 messages, it should be understood that other embodiments may detect and tunnel different types of SCTE messages or any other message data that may potentially be stripped out by an intermediate system along the transmission pather 315*a*.

If no SCTE-35 messages are identified within the transport stream (402: No), the DTVCC inserter 310*a* may output the transport stream unmodified to the local affiliate and/or other downstream receivers. However, if the DTVCC inserter 310*a* detects one or more SCTE-35 messages within the designated packet ID of the transport stream (402: Yes), then in step 404 the DTVCC inserter 310*a* may extract the SCTE-35 message data, including the presentation timestamp (PTS) value and any additional metadata within the SCTE-35 message. As discussed above, the DTVCC inserter 310*a* may be configured not to alter to remove the SCTE-35 message itself from the transport stream, and thus the extraction in step 404 might only include parsing MPEG transport packets from the specific packet ID in order to extract the MPEG sections corresponding to the SCTE-35 message.

In step 405, the DTVCC inserter 310*a* selects a particular closed caption service to carry the SCTE-35 message data downstream. Generally, the selection of a DTVCC service in step 405 may be based on the current configuration settings of the DTVCC inserter 310*a*, which may be flexible in some cases. For example, a default setting or user-selected DTVCC service may select a higher number closed captioning service to carry the SCTE-35 message data, because the higher number DTVCC services are unlikely to be used to transmit closed captioning data. For example, certain broadcasts supports 63 different closed captioning services, of which only the first few lower numbered services are designated for specific languages of closed captioning content and/or reserved for other purposes. In such cases, both the DTVCC inserter 310*a* and the DTVCC extractor 320*a* may coordinate with the selection of a particular designated high-number closed captioning service (e.g., service number 59, 60, 61, 62, or 63), to reduce the likelihood of impacting the delivery of actual closed captioning data that may potentially be seen by a viewer. Further, in some examples, the particular number of the closed captioning service selected may be based on the message detected from the transport stream in step 402. For instance, when the DTVCC inserter 310*a* detects and extracts a SCTE-35 message, it may be configured to select DTVCC service 35, or other message-specific service number. Such embodiments may be advantageous in that the broadcast system 300*a* may detect, process, and tunnel different message types simultaneously using different DTVCC services; however, such embodiments also may require the DTVCC extractor 320*a* to listen on multiple DTVCC services for incoming tunneled messages.

In step 406, the DTVCC inserter 310*a* may insert the appropriate MPEG sections extracted from the packet ID for the received message, into the selected DTVCC service. For SCTE-35 messages, such MPEG sections may include the presentation timestamp (PTS) value identifying the time of an upcoming advertising break, along with any additional related metadata within the SCTE-35 message. As discussed above, if the presentation timestamp within a SCTE-35 message is an absolute timestamp, then in some embodiments the DTVCC inserter 310*a* may be configured to convert the absolute PTS to a relative PTS based on the closest video frame PTS. In such cases, the relative PTS value, rather than absolute PTS value may be inserted into the DTVCC service, even though the original absolute PTS value remains in the SCTE-35 message within the same transport stream. Finally, in step 407, the DTVCC inserter 310*a* may output the modified transport stream, having the SCTE-35 section data carried within the selected DTVCC service.

Figure 5:
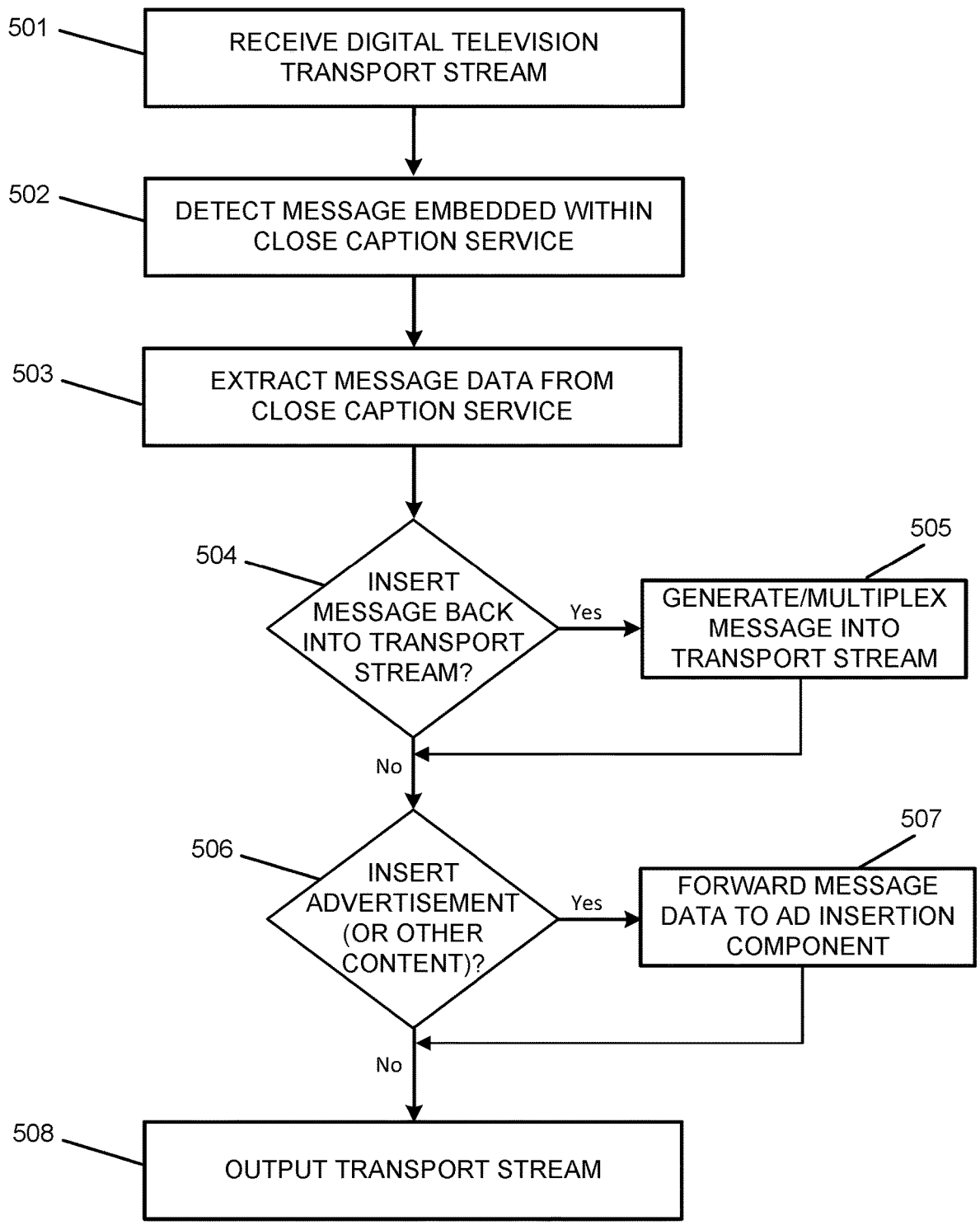
FIG. 5 is a flow diagram illustrating an example process of tunneling messages by an downstream television receiver, in accordance with certain embodiments of the present disclosure.

Referring now to FIG. 5, another flow diagram is shown illustrating a corresponding process to that shown in FIG. 4, in which a downstream system receives and processes messages tunneled within closed captioning services of a received television broadcast. Steps 501-508 in this example may be performed by a DTVCC extractor 320*a*, which may be implemented within or associated with a downstream satellite provider system, cable provider system, or over-the-top content provider system. As discussed above, in some cases steps 501-508 may correspond to the receiving of tunneled SCTE-35 messages from a national broadcaster 310*b* though a local affiliate 315*b* and/or other intermediate transcoders, to a downstream television provider 320*b*. Thus, steps 501-508 may correspond to the steps performed by a DTVCC extractor 320*a* operating at or in conjunction with the downstream television provider 320*b*.

In step 501, the DTVCC extractor 320*a* may receive a single program transport stream (SPTS) with one or more DTVCC services. As discussed above, the transport stream may originate from a top-level transmitter, such as a national digital television broadcaster 310*b*, but may be received via one or more local affiliate broadcasters 315*b* and/or other intermediate systems which may have transcoded and/or modified the transport stream en route to the DTVCC extractor 320*a*.

In step 502, the DTVCC extractor 320*a* may listen for and detect data within one or more DTVCC services corresponding to an embedded message (e.g., a SCTE-35 message). As discussed above, the configuration settings of the particular DTVCC extractor 320*a* may determine on which DTVCC services the extractor 320*a* listens for and detects incoming messages. In some embodiments, the DTVCC extractor 320*a* and its corresponding upstream DTVCC inserter 310*a* may communicate, directly or indirectly, so that messages embedded by the inserter 310*a* are detectable by the extractor 320*a*. For example, one or both of the DTVCC extractor 320*a* and the DTVCC inserter 310*a* may share configuration files with their DTVCC service settings, and/or may even generate corresponding configuration files for their counterpart tunneling component. In certain examples, one or both of the DTVCC inserter 310*a* and extractor 320*a* may support a web-based interface to allow user-configuration of the DTVCC services over which the SCTE-35 messages may be sent. Additionally, as noted above, the DTVCC extractor 320*a* may in some cases be required to monitor multiple DTVCC services for incoming messages, and different message types (SCTE or otherwise) may be inserted within different DTVCC services. In step 503, the DTVCC extractor 320*a* may extract the messages detected within the DTVCC services. As discussed above, extraction may include extracting the MPEG sections corresponding to an embedded message from the one or more specified DTVCC services. Additionally, as discussed above, if the presentation timestamp within the extracted message is a relative timestamp, then in some embodiments the DTVCC extractor 320*a* may be configured to convert the relative PTS back to an absolute PTS based on the closest video frame PTS. In such cases, the absolute PTS value, rather than relative PTS value may be used by the DTVCC extractor when processing the message, for example, by perform ad insertion and/or the regeneration and multiplexing of the SCTE-35 message back into the transport stream.

Steps 504-508 represent the processing of a message extracted from a DTVCC service by a DTVCC extractor 320*a*. In some embodiments, separate components (e.g., separate devices and separate software modules) may perform the message extraction and message processing tasks. However, in this example, it may be assumed that the DTVCC extractor 320*a* contains the necessary features and functionality to both extract and process the messages embedded within DTVCC services. In steps 504-505, depending on the configuration settings of the DTVCC extractor 320*a*, and/or depending on the extracted message, the DTVCC extractor 320*a* may regenerate the message and multiplex the message back into the transport stream. The regeneration and multiplexing of messages by the DTVCC extractor 320*a* may be advantageous, for example, in embodiments when a subscriber device 330 or other system downstream may be responsible for selecting/inserting advertisements or other content into stream. In such cases, the devices further downstream may rely on the SCTE-35 messages as though they were inserted by the original top-level broadcaster. In some embodiments, the DTVCC extractor 320*a* may be configured such that only certain types of extracted messages are reinserted back into the transport stream (504: Yes), while other types of extracted messages are not (504: No). In such embodiments, the determination may be based on the particular DTVCC service over which the message was received, the type of message (e.g., SCTE-35 versus other SCTE messages), or the content of the particular MPEG sections extracted (e.g., based on the timestamp or other metadata within a particular SCTE-35 message).

Steps 506-507 represent another optional processing path for the DTVCC extractor 320*a*, for messages extracted from a DTVCC service. In steps 506-507, depending on the configuration settings of the DTVCC extractor 320*a*, and/or depending on the extracted message itself, the DTVCC extractor 320*a* may forward the extracted message to an advertising insertion component (or other content insertion component) to insert content based on the SCTE-35 message. For example, an DTVCC extractor 320*a* operating at a satellite, cable, or OTT provider system 320*b* may forward the extracted SCTE-35 message data to an insertion component within the same television provider system 320*b*, so that an advertisement or other content may be selected (e.g., based on the metadata within the extracted SCTE-35 message) and inserted into the transport stream at the appropriate timestamp (e.g., based on the presentation timestamp within the extracted SCTE-35 message). In some embodiments, the DTVCC extractor 320*a* may be configured such that only certain messages or types extracted messages are forwarded to an ad/content insertion component (506: Yes), while other messages or types messages are not (506: No). In such embodiments, the determination may be based on the particular DTVCC service over which the message was received, the type of message (e.g., SCTE-35 versus other SCTE messages), or the content of the particular MPEG sections extracted (e.g., based on the timestamp or other metadata within a particular SCTE-35 message). Finally, in step 508, the DTVCC extractor 320*a* may output the transport stream, which may or may not have been modified by inserting back in the SCTE-35 message, to the subscriber devices 330 and/or other downstream systems.

As discussed above, in some embodiments of the systems, methods, and other techniques described herein, the DTVCC inserter 310 and DTVCC extractor 320 may collaborate to select the particular types of messages that may be tunneled, and/or the particular closed captioning services over which those messages may be inserted. For example, with respect to the selection of a particular DTVCC service, the DTVCC inserter 310 and the DTVCC extractor 320 may designate a specified high-number closed captioning service in order to reduce the likelihood of affecting the existing closed caption functionality of the system. Additionally, in some cases, the DTVCC inserter 310*a* and extractor 320*a* may be respectively configured to encrypt/decrypt and/or to compress/decompress the data embedded into the closed captioning streams, which includes the additional technical advantages of preventing hacking by untrusted third-parties, or modification of the tunneled message data by any intermediate systems or by end users.

Among the additional advantages of the techniques described herein, in some embodiments, digital television broadcast transmission architectures such as those described herein may allow national broadcasters and/or other top-level content transmitters the ability to designate particular ad insertion opportunities for local affiliates, while designating other ad insertion opportunities for one or more other systems downstream from the local affiliates (e.g., satellite providers, cable providers, OTT systems, or individual STBs, etc.). For instance, by defining designated uses for particular closed captioning services, using different encryption keys, and the like, a national broadcaster 320*a* may embed different SCTE-35 messages (e.g., at different times or corresponding to the same advertising insertion time) in such a way as to be detected by different DTVCC extractors 320a operating on different various different entities along the transmission path. For instance, a first uplink center for a first satellite television provider 110 may be designated a first closed captioning service, while a different satellite television provider may be designated a different closed captioning service. Similarly, certain other intermediate transcoding systems or end user equipment (e.g., STBs) may be designated other closed captioning services, and so on. In other examples, certain closed captioning services may be shared, but different identifiers and/or encryption codes may be used to determine which downstream system is responsible for inserting advertising or other content for a particular SCTE-35 message.

As noted above, certain embodiments of message tunneling systems/functionality described herein may include the additional step of re-adjusting the presentation timestamp (PTS) value in the MPEG transport stream after one or more transcodings occur within the broadcast stream, somewhere between the top-level transmitter (e.g., a national broadcaster) and the end user devices (e.g., STBs). Such embodiments may provide advantages with respect to preventing the timing values embedded inside the SCTE-35 message data within the closed captioning stream from becoming out of sync with the transport stream during transcoding. Because the SCTE-35 message data may be embedded within a closed captioning service by the original transmitter, the timing data for the embedded/tunnel SCTE-35 may be relative to the original transport stream. However, once the transport stream is decoded/encoded one or more times by a local affiliate (or other intermediate system), the PTS time values in the transport stream may keep changing. Thus, the presentation timing within the version of the stream received by a satellite uplink center or other downstream device may be different from the original stream. In some cases, the adjustment may be made by identifying a common frame between the original and current versions of the video stream, and then adjusting the timing information based on time differences between the common frame. In some cases, after identifying a common frame, the SCTE-35 data may be converted from an absolute time value to a relative time value.

Further, although certain examples describe herein relate to tunneling SCTE-35 messages in particular, by embedding those messages within closed captioning services, it should be understood that similar or identical tunneling techniques may be used to transmit other data as well. In particular, for video streams originating with a top-level transmitter, passing through one or more local affiliates/intermediate transmitters, any data may be embedded within the closed captioning streams to effectively tunnel the data through the intermediate levels/local affiliates. In some cases, the embedded data may be trigger data that is detected by a downstream cable or satellite provider, or by the STBs themselves, that engages certain interactive television features for the user, such as playing a video stored on the hard drive of the STB. In other examples, the tunneled data embedded within the closed captioning services may be indicators of when each commercial starts and stops. In these examples, the STB receiver may parse out that data from the stream, and then may provide the functionality to cut out (and/or replace) some or all of the commercials for record and playback via DVR, based on the commercial start and end timestamps.

Figure 6:
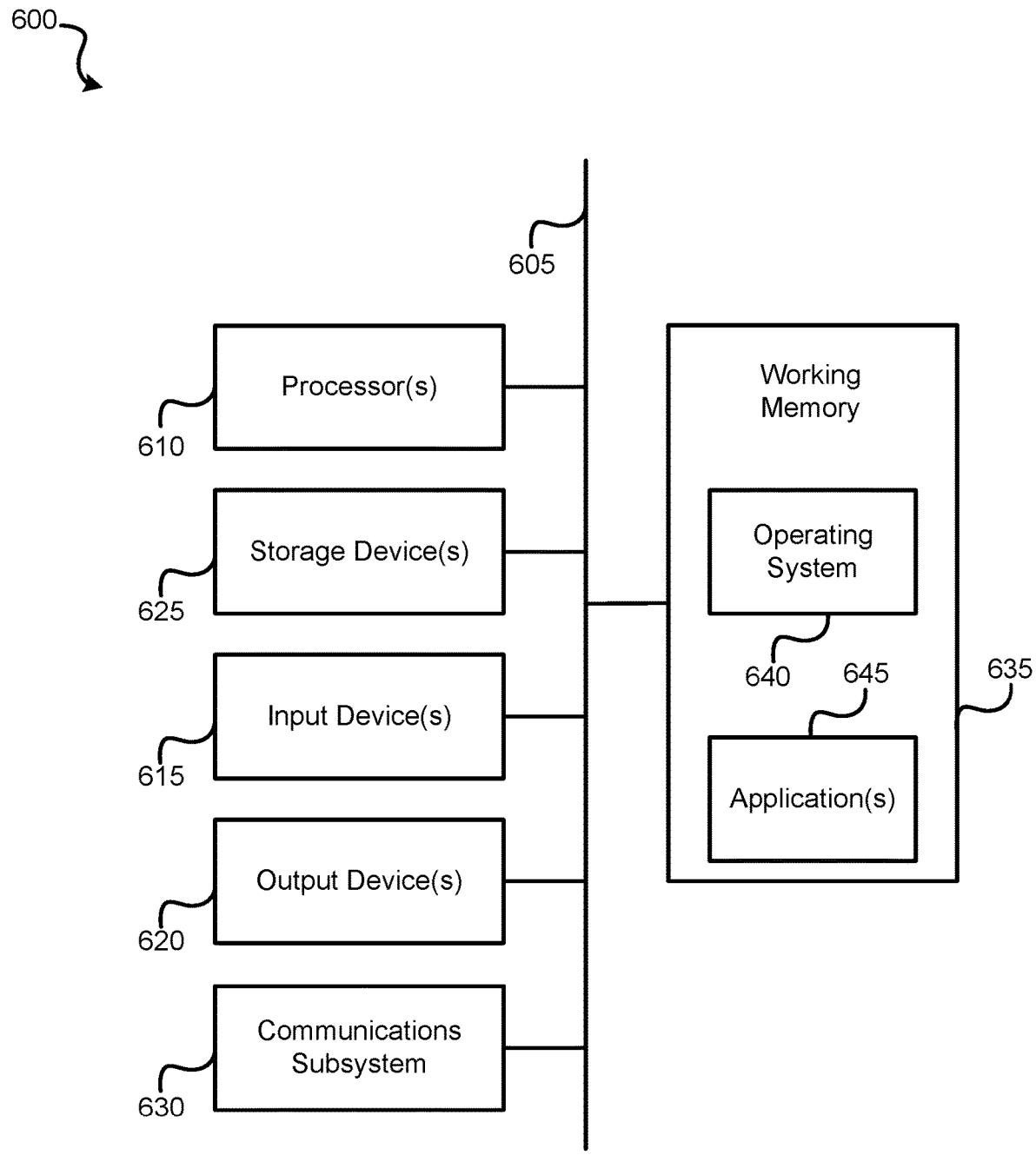
FIG. 6 is a schematic illustration of one embodiment of a computer system that can perform the methods provided by various embodiments, in accordance with certain embodiments of the present disclosure.

A computer system as illustrated in FIG. 6 may be incorporated as part of the previously described devices, such as the content receiver (e.g, set-top box). FIG. 6 provides a schematic illustration of one embodiment of a computer system 600 that can perform the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. In many embodiments, the computer system 600 will further comprise a working memory 635, which can include a RAM or ROM device, as described above.

The computer system 600 might also include a communications subsystem 630, which can include without limitation a modem, a network card (wireless or wired), an infrared communication device, a wireless communication device, and/or a chipset (such as a Bluetooth™ device, an IEEE 802.11/WiFi device, a WiMax device, cellular communication facilities, etc.), and/or the like. The communications subsystem 630 may permit data to be exchanged with a network (such as the network described below, to name one example), other computer systems, and/or any other devices described herein.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. In some embodiments, the entirety of one or more programs of interest may be recorded, and highlights within each program may be marked so that the user may directly skip to one highlight at a time.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A television broadcast message tunneling system comprising a digital television closed captioning inserter, the digital television closed captioning inserter comprising:
one or more processors;
one or more network interfaces configured to receive and output video broadcast transport streams; and
one or more computer-readable storage media devices coupled to the one or more processors, the storage media devices storing therein computer executable instructions, which, when executed by the one or more processors, cause an upstream component of the television broadcast message tunneling system to:
receive a first transport stream corresponding to a digital television video broadcast, the first transport stream having, multiplexed thereon, digital television video content and one or more Society of Telecommunications Engineers (SCTE) messages;
extract data of the one or more SCTE messages;
determine a digital television closed captioning service of the first transport stream;
modify the first transport stream, by embedding the data of the one or more SCTE messages into a logical tunnel associated with the digital television closed captioning service, such that the modified first transport stream separately comprises the digital television video content and the digital television closed captioning service; and
output the modified first transport stream to a destination downstream content receiver via one or more intermediate downstream content receivers, each of the upstream component, the destination downstream content receiver, and the one or more intermediate downstream content receivers being a separate device,
wherein, responsive to receiving the modified transport stream by any intermediate downstream content receiver of the one or more intermediate downstream content receivers, the intermediate downstream content receiver is to decode and re-encode the digital television video content of the modified transport stream without decoding and re-encoding the data of the one or more SCTE messages embedded into the digital television closed captioning service, and
wherein, responsive to receiving the modified transport stream by the destination downstream content receiver, the destination downstream content receiver is to extract the data of the one or more SCTE messages from the digital television closed captioning service, recreate the SCTE messages, and re-multiplex the recreated SCTE messages and the digital television video content into a second transport stream.

2. The television broadcast message tunneling system of claim 1, wherein the one or more SCTE messages include one or more SCTE-35 messages, and wherein the extracted data of the one or more SCTE messages comprises time data.

3. The television broadcast message tunneling system of claim 1, the storage media devices storing therein additional computer executable instructions, which, when executed by the one or more processors, causes the television broadcast message tunneling system to:
convert one or more absolute presentation timestamp values extracted from the one or more SCTE messages into corresponding relative presentation timestamp values,
wherein modifying the first transport stream comprises inserting the corresponding relative presentation timestamp values into the digital television closed captioning service.

4. The television broadcast message tunneling system of claim 1, wherein:
extracting the data of the one or more SCTE messages comprises accessing a first elementary stream associated with a first packet identifier, the first packet identifier associated with transportation of SCTE messages within the first transport stream, and
modifying the first transport stream comprises modifying a second elementary stream associated with a second packet identifier, the second packet identifier associated with the digital television video content of the first transport stream.

5. The television broadcast message tunneling system of claim 4, wherein extracting the data of the one or more SCTE messages comprises:
parsing a plurality of MPEG transport packets from the first transport stream; and
extracting one or more MPEG sections having the first packet identifier.

6. The television broadcast message tunneling system of claim 1, the storage media devices storing therein additional computer executable instructions, which, when executed by the one or more processors, causes the television broadcast message tunneling system to:
encrypt the data of the SCTE messages prior to the data being embedded into the digital television closed captioning service.

7. The television broadcast message tunneling system of claim 1, wherein determining the digital television closed captioning service comprises selecting the digital television closed captioning service from a plurality of different digital television closed captioning services within the first transport stream, based on at least one of (a) the SCTE messages multiplexed on the first transport stream, or (b) the extracted data of the SCTE messages.

8. A method of tunneling messages within a video broadcast transport stream, the method comprising:
receiving, by a digital television closed captioning inserter component of an upstream component of a television broadcast message tunneling system, a first transport stream corresponding to a digital television video broadcast, the first transport stream having, multiplexed thereon, digital television video content and one or more Society of Telecommunications Engineers (SCTE) messages;
extracting, by the digital television closed captioning inserter component, data of the one or more SCTE messages;
determining, by the digital television closed captioning inserter component, a digital television closed captioning service of the first transport stream;
modifying, by the digital television closed captioning inserter component, the first transport stream, by embedding the data of the one or more SCTE messages into a logical tunnel associated with the digital television closed captioning service, such that the modified first transport stream separately comprises the digital television video content and the digital television closed captioning service; and
outputting, by the digital television closed captioning inserter component, the modified the first transport stream, to a destination downstream content receiver via one or more intermediate downstream content receivers, each of the upstream component, the destination downstream content receiver, and the one or more intermediate downstream content receivers being a separate device, the outputting being, such that:

responsive to receiving the modified first transport stream by any intermediate downstream content receiver of the one or more intermediate downstream content receivers, the intermediate downstream content receiver decodes and re-encodes the digital television video content of the modified transport stream without decoding and re-encoding the data of the one or more SCTE messages embedded into the digital television closed captioning service; and responsive to receiving the modified transport stream by the destination downstream content receiver, the destination downstream content receiver extracts the data of the one or more SCTE messages from the digital television closed captioning service, recreates the SCTE messages, and re-multiplexes the recreated SCTE messages into a second transport stream.

9. The method of claim 8, wherein the SCTE messages include one or more SCTE-35 messages, and wherein the extracting the data comprises extracting time data from each of the one or more SCTE-35 messages.

10. The method of claim 8, wherein the extracting the data comprises extracting one or more absolute presentation timestamp values from the one or more SCTE messages, and further comprising:

converting the one or more absolute presentation timestamp values extracted from the one or more SCTE messages into corresponding relative presentation timestamp values, wherein modifying the first transport stream comprises inserting the corresponding relative presentation timestamp values into the digital television closed captioning service.

11. The method of claim 8, wherein:

extracting the data of the SCTE messages comprises accessing a first elementary stream associated with a first packet identifier, the first packet identifier associated with transportation of the SCTE messages within the first transport stream; and modifying the first transport stream comprises modifying a second elementary stream associated with a second packet identifier, the second packet identifier associated with the digital television video content of the first transport stream.

12. The method of claim 11, wherein extracting the data of the one or more SCTE messages embedded within the first transport stream comprises:

parsing a plurality of MPEG transport packets from the first transport stream; and extracting one or more MPEG sections having the first packet identifier.

13. The method of claim 8, further comprising:

encrypting the extracted data of the SCTE messages prior to the data being inserted into the digital television closed captioning service.

14. The method of claim 8, wherein determining the digital television closed captioning service comprises selecting the digital television closed captioning service from a plurality of different digital television closed captioning services of the first transport stream based on at least one of (a) the one or more SCTE messages, or (b) the data of the one or more SCTE messages.

15. The television broadcast message tunneling system of claim 1, further comprising a digital television closed captioning extractor, the digital television closed captioning extractor comprising:

second one or more processors;

second one or more network interfaces configured to receive and output the video broadcast transport streams; and second one or more computer-readable storage media devices coupled to the second one or more processors, the second storage media devices storing therein second computer executable instructions, which, when executed by the second one or more processors, cause the destination downstream content receiver to:

receive the modified transport stream from one of the intermediate downstream content receivers;

extract the data of the one or more SCTE messages from the digital television closed captioning service;

recreate the SCTE messages; and re-multiplex the recreated SCTE messages and the digital television video content into the second transport stream.

16. The television broadcast message tunneling system of claim 1, wherein:

the digital television closed captioning inserter is in the upstream component of the television broadcast message tunneling system; and the digital television closed captioning extractor is in the destination downstream content receiver of the television broadcast message tunneling system.

* * * * *